(12) United States Patent
Pinchen

(10) Patent No.: US 7,150,802 B2
(45) Date of Patent: Dec. 19, 2006

(54) METHOD FOR APPLYING TEAR TAPE WITH DISCRETE FISCAL MARKS FOR DISCRETE PACKAGES

(75) Inventor: Stephen Pinchen, Etwall (GB)

(73) Assignee: P. P. Payne Limited, Nottingham (GB)

( * ) Notice: Subject to any disclaimer, the term of this patent is extended or adjusted under 35 U.S.C. 154(b) by 0 days.

(21) Appl. No.: 10/856,229

(22) Filed: May 28, 2004

(65) Prior Publication Data
US 2004/0261361 A1    Dec. 30, 2004

Related U.S. Application Data

(62) Division of application No. 10/380,226, filed as application No. PCT/GB01/04061 on Sep. 11, 2001.

(30) Foreign Application Priority Data

Sep. 11, 2000 (GB) ................................. 0022225.7

(51) Int. Cl.
*B32B 37/12* (2006.01)

(52) U.S. Cl. .......................... 156/324; 156/85; 53/412; 53/419

(58) Field of Classification Search ............ 156/84–86; 53/412, 419, 133.5, 133.6, 133.7, 137.2; 229/87.05, 87.13; 206/264, 497; 428/343, 428/352, 354, 913
See application file for complete search history.

(56) References Cited

U.S. PATENT DOCUMENTS

| | | | | |
|---|---|---|---|---|
| 4,779,733 A | * | 10/1988 | Kilian | ...................... 206/459.5 |
| 4,844,962 A | | 7/1989 | May et al. | |
| 5,730,354 A | | 3/1998 | O'Connor | |
| 5,788,076 A | | 8/1998 | Simmons | |
| 5,806,281 A | | 9/1998 | Krul et al. | |
| 6,255,948 B1 | * | 7/2001 | Wolpert et al. | .......... 340/572.8 |

FOREIGN PATENT DOCUMENTS

| | | | |
|---|---|---|---|
| EP | 121371 | * | 10/1984 |
| EP | 0 275 178 A2 | | 7/1988 |
| EP | 0585076 | * | 3/1994 |
| FR | 2 742 735 | | 6/1997 |

* cited by examiner

*Primary Examiner*—Jessica Rossi
(74) *Attorney, Agent, or Firm*—Banner & Witcoff, Ltd.

(57) ABSTRACT

A method of applying fiscal indicia, such as a tax stamp, to an article wherein the article is enclosed at least in part by a film packaging material with an associated tear tape, the tear tape comprising a base film of oriented thermoplastic having a coating of pressure sensitive adhesive on one side of the film and with a coating of release agent on an opposed side of the film and wherein the tear tape carries the fiscal indicia such as a tax stamp thereon.

4 Claims, 2 Drawing Sheets

METHOD FOR APPLYING TEAR TAPE WITH DISCRETE FISCAL MARKS FOR DISCRETE PACKAGES

CROSS REFERENCE TO RELATED APPLICATION

This application is a division of U.S. National Phase application Ser. No. 10/380,226, filed Jun. 25, 2003, which claims priority of PCT Application No. PCT/GB01/04061 filed Sep. 11, 2001, which claims priority of United Kingdom Application No. 0022225.7 filed Sep. 11, 2000, all of which are incorporated herein by reference in their entirety.

BACKGROUND OF THE INVENTION

The present invention relates to a teartape bearing discrete marks, and to a method of applying such marks to packaged articles, and is concerned particularly, although not exclusively, with a teartape bearing discrete fiscal marks, such as "tax-paid" certifications, and to a method of applying such marks to packaged articles.

Fiscal markers, such as "tax-paid" stamps, are applied to articles to demonstrate that duty has been paid on such articles by, for example, the manufacturer. The storage of and access to such marks and their application to products must be carefully controlled to ensure that articles for which no duty has been paid may not be wrongly packaged as "duty paid" or similar. Furthermore, the marks themselves must be relatively complex so as to be difficult to reproduce by would-be counterfeiters.

An example of a product which may require a fiscal mark is a packet of cigarettes. A given country may levy a tax duty on cigarettes, whilst a neighbouring country may not, or may levy a lesser duty. To be able to distinguish between the packets which have been manufactured and packaged in accordance with a required duty, from those which have been packaged illegally in the country of interest or imported from another country, a sophisticated fiscal mark appropriate to the country of manufacture or intended sale is applied to each legitimate pack. In the prior art, the mark is in the form of a paper label, which is gummed and made to adhere to the surface of e.g. the cigarette pack, usually on the rear thereof. The supply and use of such labels may be controlled by an authorised body such as Customs and Excise. The labels themselves contain complex printed images, which it is hoped are difficult to reproduce by a would-be counterfeiter.

However, there are several disadvantages with the known fiscal marks and their method of application.

Firstly, the marks, being paper labels, are not so difficult for a counterfeiter to reproduce as is desirable. Secondly, automated application for example to cigarette packs is difficult to achieve at high speeds and with minimal rejection. In particular, each individual label must have wet glue applied to it, before it is pressed against a packet of cigarettes.

This process produces an unacceptably high number of misplaced or inadequately adhered labels, and frequently causes the packaging machinery to become jammed or gummed, all of which leads to "down time" in the packaging process.

Thus-there is a requirement for a method of applying fiscal marks to articles, at high speed, with improved reliability and security against counterfeiting.

SUMMARY OF THE INVENTION

Teartapes are employed to provide a means of facilitating the opening of packaged articles such as packs of cigarettes, which are overwrapped by a sheet of filmic packaging material. The teartape typically adheres to the inside of the filmic packaging material on the wrapped package, with one end of the tape being free. The free end may be grasped and pulled to cause the tape to tear through the filmic packaging material, thus allowing access to the article within.

According to one aspect of the present invention there is provided a method of applying fiscal indicia to articles, the method comprising enclosing at least a portion of an article with filmic packaging material and a tear tape, wherein the tear tape comprises a base film of oriented thermoplastics material having a coating of pressure sensitive adhesive on one side of the film and having a coating of release agent on an opposed side of the film, and wherein the tear tape carries a fiscal indicium thereon.

According to a second aspect of the present invention there is provided a tear tape comprising a base film of oriented thermoplastics material having a coating of pressure sensitive adhesive on one side of the film and having a coating of release agent on an opposed side of the film, the tape being provided with visual indicia thereon, including at least a plurality of discrete elements.

According to a third aspect of the present invention there is provided a method of manufacturing a tear tape, the method comprising forming discrete images on a base film of oriented thermoplastics material, coating one side of the base film with a pressure sensitive adhesive composition and coating an opposed side of the base film with release agent.

The discrete images may be at spaced locations on the base film, and may be visible through the pressure sensitive adhesive coating.

In a preferred arrangement, the discrete images comprise multicoloured printed images, such as may be formed on the base film by a gravure printing technique.

BRIEF DESCRIPTION OF THE DRAWING

Preferred embodiments of the present invention will now be described, way of example only, with reference to the accompanying diagrammatic drawings, in which.

DESCRIPTION OF THE PREFERRED EMBODIMENTS

Figure 1:
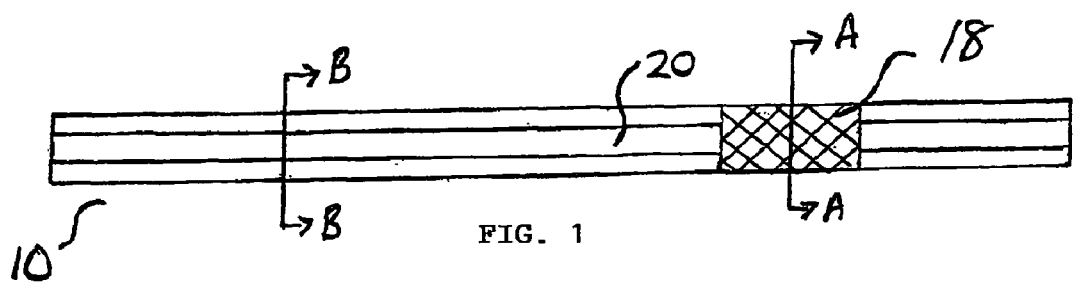
FIG. 1 shows, in plan view, a portion of tear tape in accordance with an embodiment of the present invention for use in wrapping an article such as a pack of cigarettes.
Figure 2:
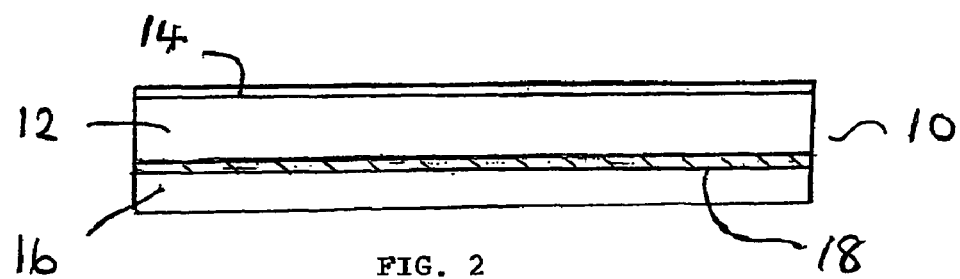
FIG. 2 is a cross section taken along A–A' of FIG. 1.
Figure 3:
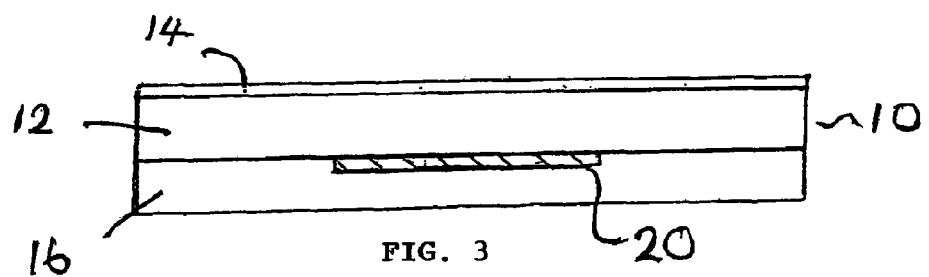
FIG. 3 is a cross section taken along B–B' of FIG. 1.

Referring to FIGS. 1 to 3, these show generally at 10 a portion of teartape according to an embodiment of the present invention. The teartape 10 is generally as described in our European Patent No. 0121371, the entire contents of which are incorporated herein by reference.

Specifically, the teartape 10 comprises a base film 12 of mono-axially oriented polypropylene, having on an upper side thereof a coating 14 of release agent, and having on a lower side thereof a coating of pressure sensitive adhesive 16 (see FIGS. 2 and 3).

FIG. 2 shows a printed image 18 on the base film 12, which image extends substantially for the full width of the tape 10. FIG. 3 shows an optional printed stripe 20 on the base film 12, which stripe is narrower than the tape 10. The base film, adhesive 16 and release layer 14 are transparent so that the image 18 and stripe 20 may be viewed through the tape.

Figure 4:
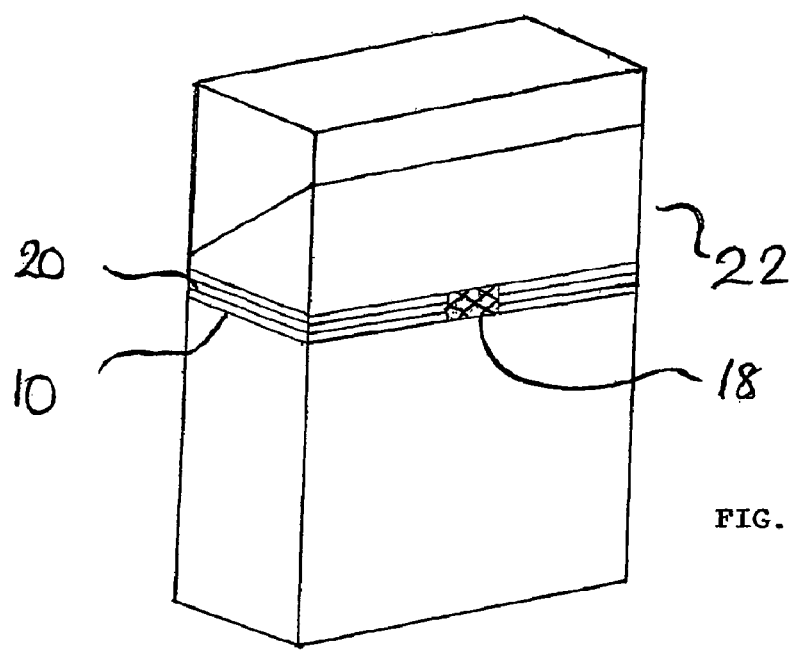
FIG. 4 shows a pack of cigarettes incorporating the tape portion of FIG. 1.

FIG. 4 shows a pack of cigarettes 22 which has been overwrapped by a conventional technique, with a sheet of filmic packaging material (not shown). The teartape 10 is adhered to the inside of the transparent filmic packaging material and a free end (not shown) of the tape may be pulled to tear open the film, thus permitting access to the cigarette pack. Because the filmic packaging material and pressure sensitive adhesive 16 are transparent, the image 18 and optional stripe 20 may clearly be seen from the outside of the pack.

Importantly, the immediate visibility of the image 10 renders it useful as a fiscal marker, i.e. an image which conveys the information that duty has been paid on the product, in this case the cigarettes, by the manufacturer. The image 10 is preferably complex and multicoloured, so as to be difficult to reproduce by a would-be counterfeiter.

The optional stripe 20 is for decoration or promotional purposes. As an alternative to a stripe a message or other printed image may be present, or the stripe 20 could be omitted completely, leaving the image 18 on a totally transparent tape.

Figure 5:
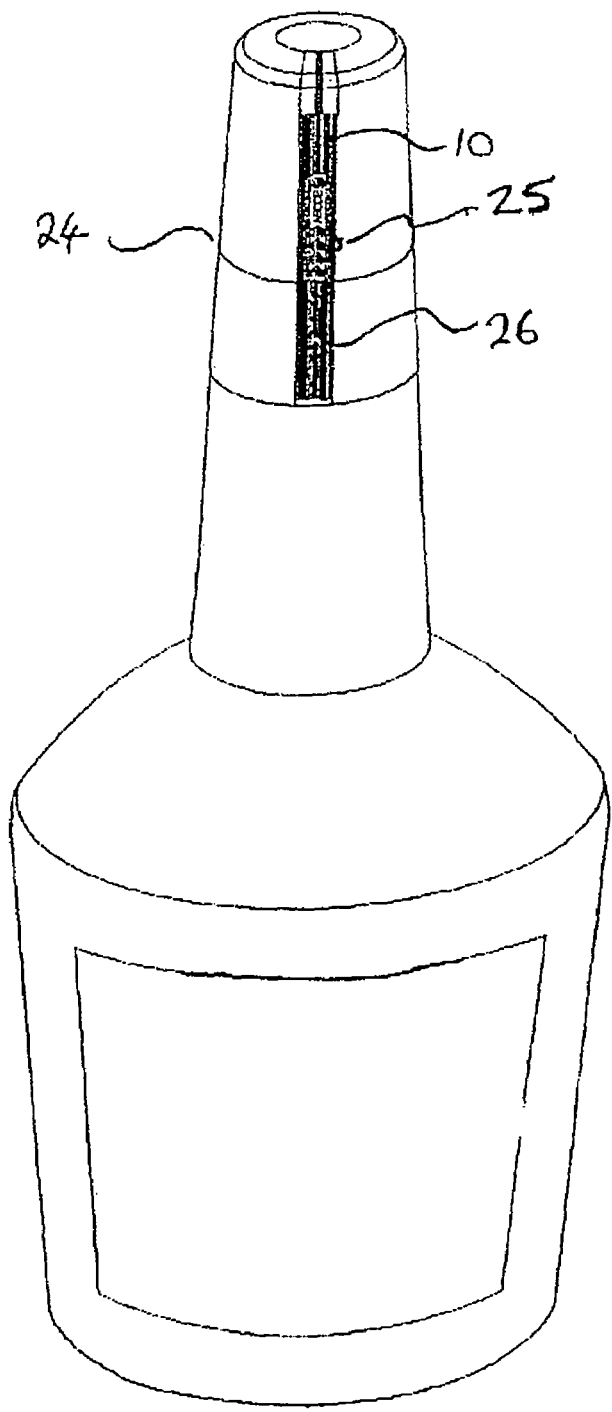
FIG. 5 shows a bottle of alcoholic liquor incorporating a portion of tear tape in accordance with an embodiment of the invention.

FIG. 5 shows an alternative use of the tear tape 10, this time as part of a shrink-sleeve 24 on the neck of a bottle of alcoholic liquor. In this case the sleeve is provided with perforations 25 either side of the tape 10, so that the sleeve, which is of thicker grade film than is used in the wrapping of cigarettes, tears readily when the tape is pulled.

Figure 6:
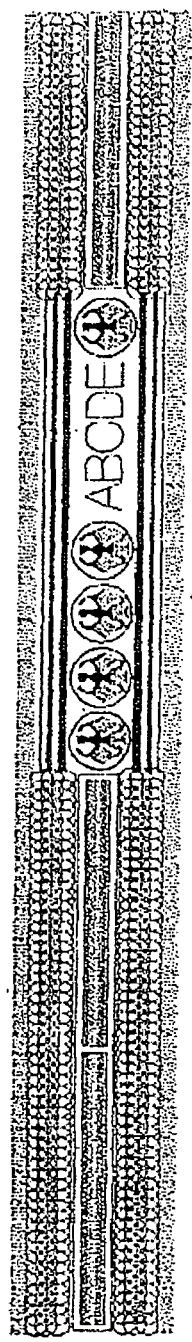
FIG. 6 shows the portion of tear tape of FIG. 5, in more detail.

FIG. 6 is an example of a complex fiscal mark 26 which may be carried by the tape 10 of FIG. 5. The mark 26 bears a unique code, represented here as "ABCDE" which has been printed directly onto the tear tape as a final process using e.g. an ink-jet printer.

The code is unique to the particular mark to which it is applied.

Teartapes are typically manufactured as self-wound, traverse wound tapes of several thousands, or even tens of thousands, of meters in length. The need for such lengths is to facilitate their use in high speed packaging machines, such as cigarette packaging machines, so that a single spool will last for several hours or so before having to be replaced.

The image 18 is repeated at predetermined spaced locations on the tape 10, so that predetermined lengths of tape, each bearing an image 18, may be severed from the spool and brought into contact with a portion of the filmic packaging material before the article is packaged. Controlling the length of the tape portion, together with careful registration of the tape with an edge (not shown) of the filmic packaging material and careful registration of the tape and film with the article to be packaged, enables the image 18 to be located in a predetermined position in relation to the article. In the case of the FIG. 4 embodiment this is at the back of the pack. The predetermined location is substantially identical for each pack. This permits the ready inspection of all cigarette packs to ensure that they have the required image, and in the example mentioned above this permits easy recognition that duty has been paid on the contents of the pack.

Accurate registration may be achieved by the use of registration marks on the tape which may be detected by automated reading apparatus. The marks may be invisible at optical wavelengths.

The use of teartapes to apply fiscal markers has advantages for security. Firstly, the markers themselves are located on a traverse wound spool of tape which can contain a known number of markers.

Access to and delivery of the spool, together with application of the marks, can thus be monitored. In addition, the reproduction of fiscal marks on a teartape by would-be counterfeiters is much more difficult to achieve than the reproduction of paper labels, irrespective of the complexity of the mark itself.

Furthermore, each marker may be printed with a unique identification code, such as an alphanumeric code, which enables individual articles to be tracked and traced. This process may take place at the end of manufacture by unwinding the tape, printing each i.d. code, using e.g. an ink-jet printer, and then re-winding the tape.

The images may be formed using a multi-gravure process, involving inks of several different colours, each printed separately. The precise registration of the separate, differently coloured over-printed images requires a great deal of skill, and this adds to the difficulty of counterfeit reproduction.

As well as gravure techniques other printing techniques may be employed, such as screen printing, letterpress or flexographic printing, or indeed a combination of these. Inks which may be used include UV, IR and Optically Variable Inks. Furthermore the forming of the images may include embossing a surface of the tape, for example a surface coated with embossing lacquer, with or without a metallic layer to form a holographic image. Alternatively or additionally, parts of the image may be etched.

Using some or all of these techniques a considerably complex mark or indicium which may contain both overt and covert components can be formed on the tape.

No wet adhesive is required, and the images, being integral with the tape, are never loose. Thus, the disadvantages with the prior techniques of applying individual paper labels using wet adhesive, are eliminated.

The following examples illustrate the invention.

EXAMPLE 1

A uniaxially oriented film was formed from a copolymer of 90% propylene and 10% ethylene by extruding a film of the copolymer on to chill casting rollers in a conventional manner followed by stretching in the machine direction between heated rollers to impart a stretch of about six times the original length. After annealing the film had a tensile strength in the machine direction of 2800 kg/cm$^2$ with an elongation at break of 30–50%. Elongation in the lateral direction was 800–1000% at break. The film had a thickness of 40 micron and both surfaces of the film were subjected to a corona discharge at 40–50 dynes per cm. One of the surfaces was then printed repeatedly by a gravure process using different inks to produce a complex, multi-coloured image. The printed surface was then coated with a primer suitable for promoting anchorage of a subsequently applied coating of a transparent pressure sensitive adhesive composition. The non-printed surface was coated with a release agent.

The release agent comprised 100 pts of Silcolease 425 (ICI trade name for a 30% solids concentration of dimethyl polysiloxane and methyl hydrogen polysiloxane resins in toluene) together with 4 pts of Catalyst 62A and 4 pts Catalyst 62B (ICI trade names to describe 50% solids concentration of amino alkoxy-polysiloxane in toluene and alkyl tin acylate in xylene). It was applied to give a dry coating weight of 0.25 gms. per square meter. The primer was a solution in toluene of 25 parts of natural crepe rubber and 8 parts of a cross linking agent (Vulcabond TX) applied over the printed surface to give a dry coating weight of 0.25 gms. per square meter. Vulcabond TX is manufactured by ICI and is a 50% solution of polyisocyanate (mainly diphenyl methane di-isocyanate) in xylene. The pressure sensitive adhesive composition was a solution of 100 parts of natural crepe rubber, 110 parts of a tackifying resin having a melting point of 100/115° C. (Arkon P) and 1 part of antioxidant (Ircanox) dissolved in a hydrocarbon mixture (SBP2). This was applied by conventional reverse roll coating to give a dry coating weight of 15–20 gms. per square meter.

Arkon P is marketed by Arakara Chemicals and is a fully saturated alicyclic hydrocarbon resin and Irganox is marketed by Ciba Geigy and is a high molecular weight hindered polyphenol. The coated film was then slit to 3 mm width and the resultant teartape was traverse wound on to centres of internal diameter 150 mm and width 170 mm to provide reels carrying continuous lengths of tape (e.g. 30,000–50,000 meters long as required). The reels were then inserted into a tape dispenser similar to that shown and described in our European Patent No. 0121371 and this was used to apply the tape to a polypropylene packaging film in a film overwrap machine. The interacting tension compensator and brake mechanisms and the adjustable torque motor drive of the tape dispenser enabled tension imbalance between the tape and the film to be avoided particularly during starting and stopping of the machine. The printed matter on the tear tape was right reading when viewed through the adhesive and the packaging film.

EXAMPLE 2

Example 1 was repeated using a pressure sensitive adhesive composition and primer based on acrylic resins and release agent based on a different silicone resin. Similar results were obtained.

The pressure sensitive adhesive composition was a 45% solids solution of a self cross-linking acrylic polymer in a mixture of 37 parts ethyl acetate, 26 parts heptane, 26 parts isopropanol, 1 part toluene and 1 part acetylacetone. This is commercially available as Bondmaster 1054 from National Adhesives Ltd.

The primer was a mixture of 100 parts of the aforesaid Bondmaster 1054, 1400 parts of toluene, and 10 parts of the aforesaid Vulcabond TX.

The release agent comprised 20 parts of Syloff 7046, 79.9 parts of toluene and 0.1 part of a reactive siloxane polymer known as catalyst/cross linking agent 7048 (Dow Corning). Syloff 7046 is a mixture of reactive siloxane polymers available from Dow Corning.

Although the invention has been discussed herein with reference to an embodiment which is an over-wrapped cigarette pack, it is to be understood that the invention is applicable to the packaging of other articles, and indeed to the use of other packaging techniques, where teartapes may be employed.

The invention claimed is:

1. A method of applying fiscal indicia to articles by enclosing at least a portion of an article with filmic packaging material and a portion of tear tape, wherein the tear tape comprises a base film of oriented thermoplastics material having a coating of pressure sensitive adhesive on one side of the film and having a coating of release agent on an opposed side of the film, and wherein the tear tape carries a plurality of discrete fiscal indicium, each said indicium being distinct from the other, and including a registration mark for each said fiscal indicuim thereon, each said registration mark located substantially identically with respect to each fiscal indicium, said method comprising the steps of:

bringing together a portion of the tear tape bearing one of said fiscal indicium and one of said registration marks with a portion of the filmic packaging material;

causing said portion of tear tape to adhere to said portion or filmic packaging material;

detecting each said registration mark to enable causing said portion of tear tape and said adhered portion of packaging material to register with an article to be wrapped so that said fiscal indicium occupies a predetermined location on the article in relation to the wrapped article;

said predetermined local on each wrapped article comprising substantially the same location for all like articles in a series to which the combined portion of tear tape and portion of filmic packaging material is to be wrapped, said fiscal indicium at said predetermined location being observable upon inspection of the article from the outside of the article; and wrapping the article with said portion of tear tape and said portion of adhered filmic packaging material at least in part.

2. A method according to claim 1 wherein said filmic packaging material comprises, at least in part, a heat shrinkable filmic material.

3. A method of applying fiscal indicia to articles by enclosing at least a portion of an article with filmic packaging material and a portion of tear tape wherein the tear tape comprises a base film of oriented thermoplastics material having a coating of pressure sensitive adhesive on one side of the film and having a coating of release agent on an opposed side of the film, and wherein the tear tape carries a plurality of composite indicium, each said composite indicium comprising a discrete fiscal indicium, a second indicium and a registration mark, each said registration mark located substantially identically with respect to each fiscal indicium, said method comprising the steps of:

bringing together (i) a portion of the tear tape bearing said composite indicium and (ii) portion of the filmic packaging material, causing said portion of tear tape to adhere to said portion of filmic packaging material, detecting the registration mark to enable causing said portion of tear tape and said adhered portion of packaging material to register with an article to be wrapped so that said fiscal indicium occupies a predetermined location on the article in relation to the wrapped article, said predetermined location on each wrapped article comprising substantially the same location for all like articles in a series to which the combined portion of tear tape and portion of filmic material is to be wrapped, said fiscal indicium at said predetermined location being observable upon inspection of the article from the outside of the article, and wrapping the article with portion of tear tape said and said portion of adhered packaging material at least in part.

4. A method according to claim 3 wherein said filmic packaging material comprises, at least in part, a heat shrinkable filmic material.

* * * * *